(12) United States Patent
Kraushaar

(10) Patent No.: US 8,361,589 B2
(45) Date of Patent: Jan. 29, 2013

(54) STRUCTURAL REINFORCEMENT SYSTEM

(75) Inventor: Thomas Kraushaar, Zurich (CH)

(73) Assignee: Sika Technology AG, Baar (CH)

( * ) Notice: Subject to any disclaimer, the term of this patent is extended or adjusted under 35 U.S.C. 154(b) by 489 days.

(21) Appl. No.: 12/040,202

(22) Filed: Feb. 29, 2008

(65) Prior Publication Data

US 2009/0220737 A1 Sep. 3, 2009

(51) Int. Cl.
*B32B 3/00* (2006.01)
*B62D 21/15* (2006.01)

(52) U.S. Cl. ....... 428/71; 428/174; 428/178; 428/313.3; 428/317.1; 428/317.7; 296/187.02

(58) Field of Classification Search ............. 428/71, 428/174, 178, 188, 313.3, 313.9, 317.1, 317.7; 296/187.02, 187.03, 187.09, 187.11, 187.12, 296/187.13; 277/316; 180/89.1
See application file for complete search history.

(56) References Cited

U.S. PATENT DOCUMENTS

| | | | |
|---|---|---|---|
| 5,979,902 A * | 11/1999 | Chang et al. | 277/316 |
| 6,880,657 B2 * | 4/2005 | Schneider et al. | 180/68.5 |
| 7,105,112 B2 * | 9/2006 | Czaplicki et al. | 264/46.5 |
| 2005/0212326 A1 * | 9/2005 | Marion | 296/187.03 |

* cited by examiner

*Primary Examiner* — Donald J Loney
(74) *Attorney, Agent, or Firm* — Rader, Fishman & Grauer PLLC

(57) ABSTRACT

Disclosed are various embodiments of a structural reinforcement system. The system reinforces hollow cavities within various products to increase the structural rigidity of the product. The system generally includes a rigid carrier, an expandable material, and an adhesive. The expandable material and the adhesive are placed within the carrier such that when the expandable material expands, the adhesive moves to be positioned to bond the rigid carrier to the cavity walls.

21 Claims, 3 Drawing Sheets

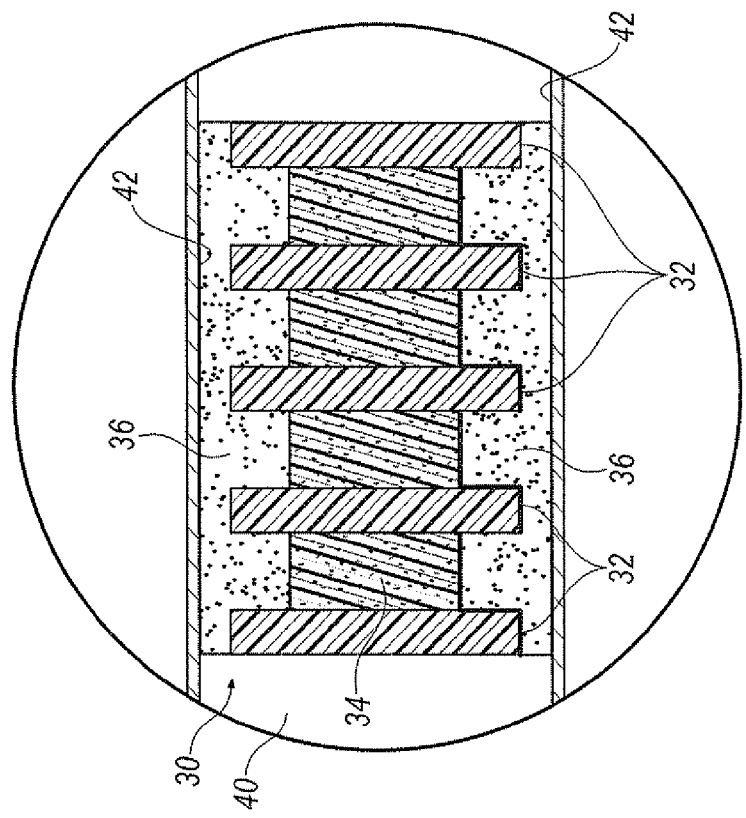
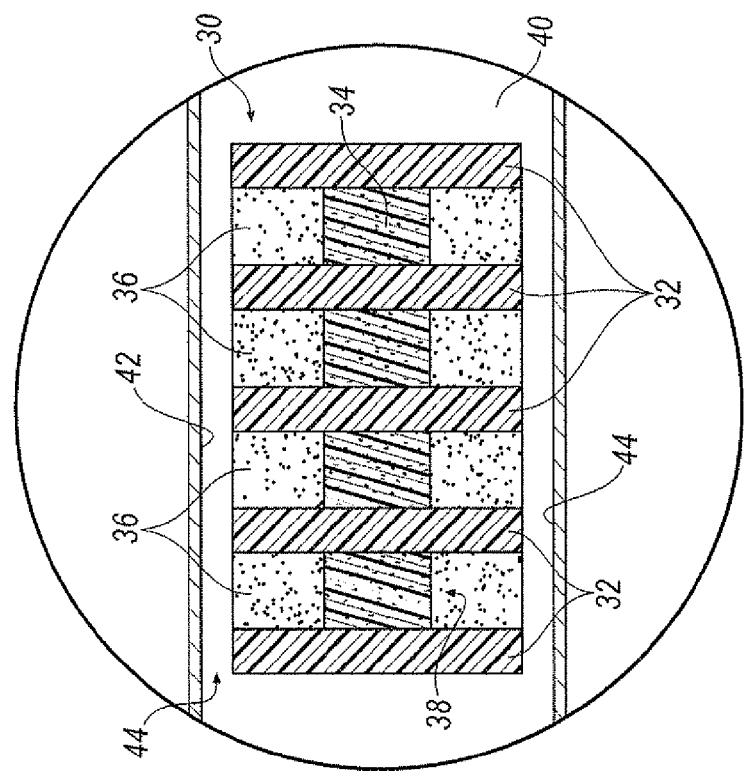

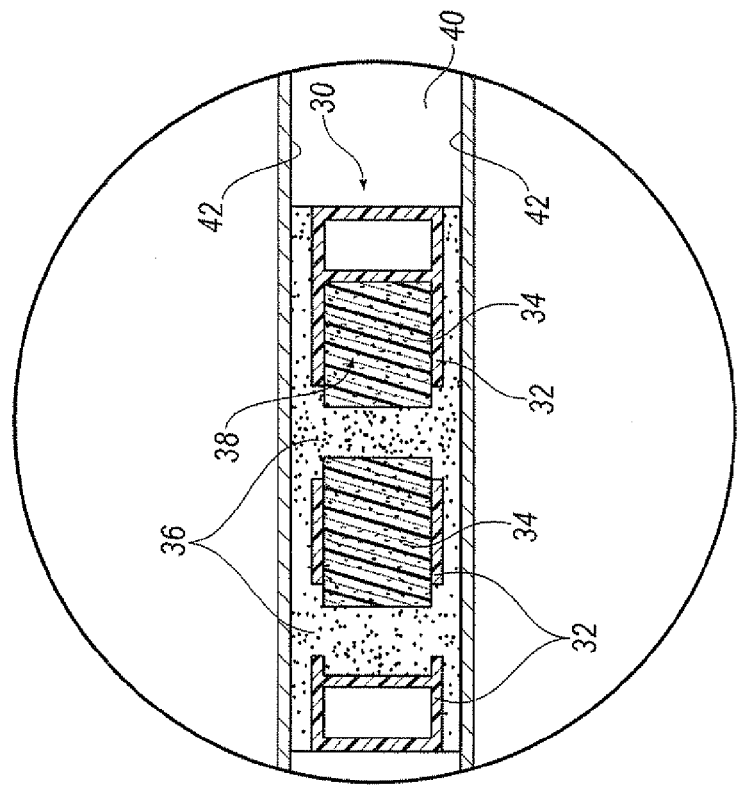
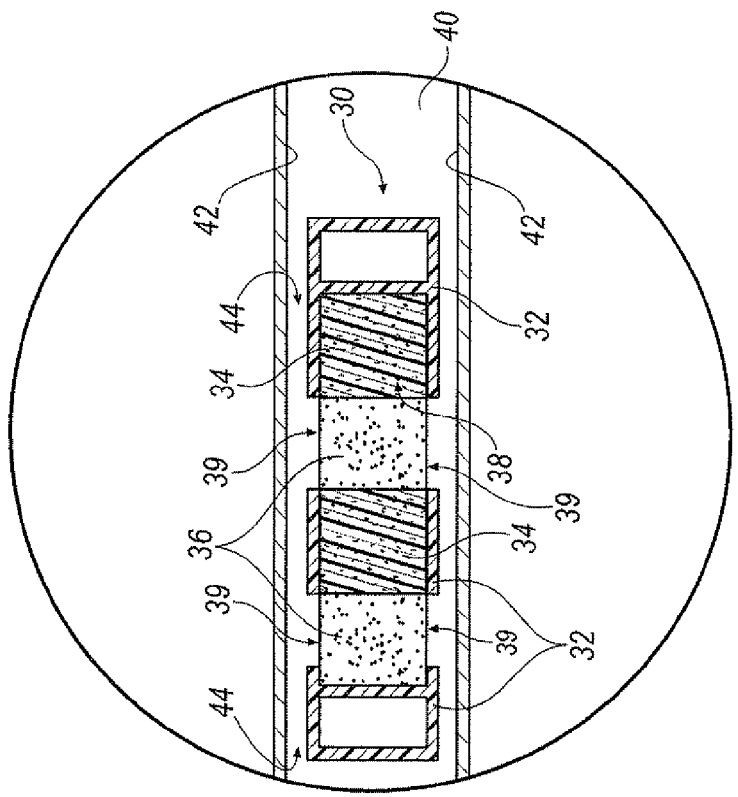

STRUCTURAL REINFORCEMENT SYSTEM

BACKGROUND

Cars, trucks, boats, trains, and planes often include frames with hollow cavities. Hollow cavities are often created in these products to reduce overall weight of the product, as well as to reduce material costs. However, introducing hollow cavities into a frame may reduce the overall strength of the frame, and may also increase noise and vibration in other parts of the vehicle.

To alleviate these, as well as other negative effects, hollow cavities often include reinforcements, including various expandable materials. Such reinforcements can decrease noise and vibration while increasing the structural stiffness of the product, thereby allowing for significant weight and material cost reductions. Some current reinforcement systems include expandable foam applied to a rigid carrier. The foam expands during the manufacturing process, securing the rigid carrier in place as the foam contacts the walls of the hollow cavity.

Reinforcement systems can provide additional structural reinforcement, as well as other benefits, through the use of novel shapes, materials, and configurations.

BRIEF DESCRIPTION OF THE DRAWINGS

FIG. 3 is a cut-away side view of a structural reinforcement system in a horizontal cavity of a structural body before activation.

FIG. 4 is a cut-away side view of a structural reinforcement system in a horizontal cavity of a structural body after activation.

FIG. 5 is a cut-away side view of another structural reinforcement system in a horizontal cavity of a structural body before activation.

FIG. 6 is a cut-away side view of another structural reinforcement system in a horizontal cavity of a structural body after activation.

DETAILED DESCRIPTION

Disclosed are various embodiments of a structural reinforcement system. The system reinforces hollow cavities within various products to increase the structural rigidity of the product. The system generally includes a rigid carrier, an expandable material, and an adhesive. The rigid carrier provides the primary structural reinforcement within the cavity, and also serves as a substrate to carry the expandable material and the adhesive. The expandable material is placed within the carrier, and the adhesive is placed on top of the expandable material. The system is configured such that when the expandable material expands, the adhesive will be pushed against the cavity walls and bond to both the rigid carrier and the cavity walls.

Figure 1:
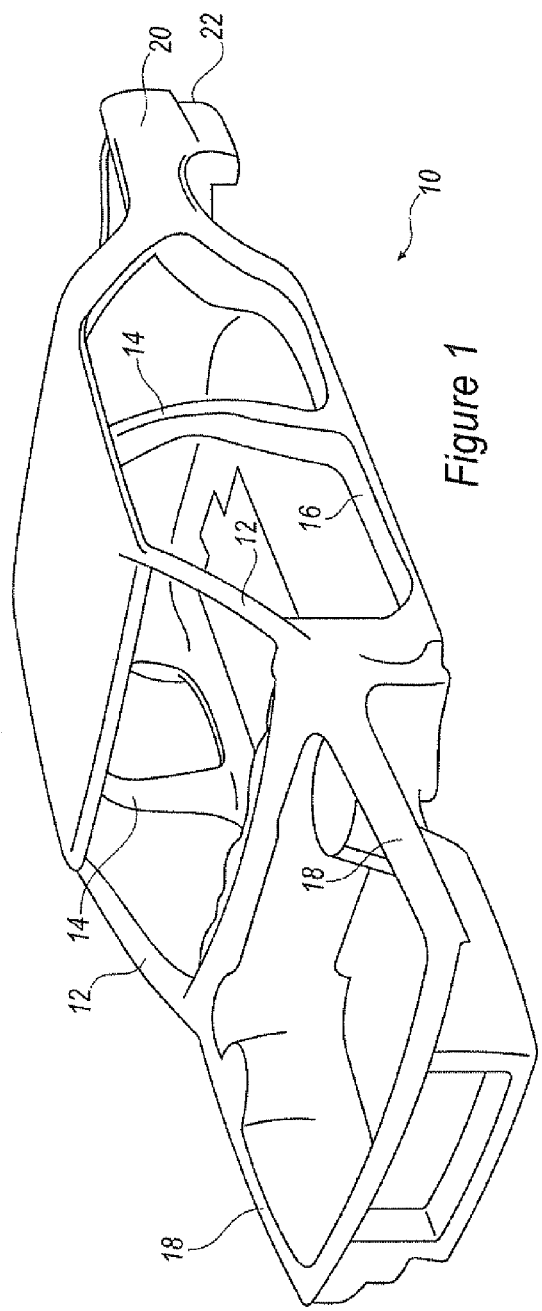
FIG. 1 is a perspective view of an automobile frame having multiple cavities.

FIG. 1 illustrates a vehicle frame 10 that includes many cavities that can be reinforced using the disclosed structural reinforcement system. Such cavities can be any size, shape, or orientation, and can be formed from any material, including various metals, composites, and/or plastics. For example, potentially reinforceable cavities within vehicle frame 10 can be found within various parts of the frame, including A-pillars 12, B-pillars 14, a rocker 16, frame rails 18, a fuel tank sealer 20, and a bumper 22. Generally, the structural rigidity of vehicle frame 10 can be greatly enhanced by reinforcing such hollow cavities within vehicle frame 10. Of course, the disclosed structural reinforcement system can also be used in various body panels, doors, and other vehicle components, and is not limited to hollow cavities within a vehicle frame.

Figure 2:
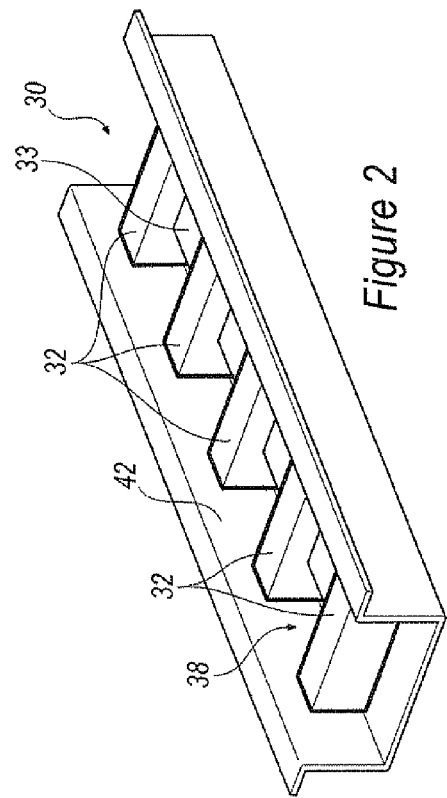
FIG. 2 is a perspective view of a structural reinforcement system in a horizontal cavity of a structural body before activation.

FIGS. 2, 3, and 4 depict one embodiment of a structural reinforcement system 30 for reinforcing a cavity 40 within vehicle frame 10. Cavity 40 can be any cavity within vehicle frame 10 and generally includes at least one interior cavity wall 44. Generally, system 30 will be designed for a specific cavity 40, such as within A-pillars 12, but system 30 can also be designed generically to fit cavities of differing dimensions. System 30 may be designed to fit a portion of cavity 40, or may be designed to fit or fill an entire cavity 40. System 30 is typically placed within a cavity and generally includes a rigid carrier 32, an expanding material 34, and an adhesive 36.

Carrier 32 is usually a rigid structure that provides structural reinforcement within cavity 40, and provides a base or substrate for expanding material 34 and adhesive 36. Carrier 32 can be formed of a singular material, or it can be formed as separate components that are fastened together. Carrier 32 can be made from any number of different materials, including various metals, plastics, composites, and the like, including various polyamides. Of course, the particular material or materials may also depend on the particular application. Carrier 32 can be formed in a variety of shapes and configurations, including portions that are cylindrical, rectangular, contoured, angled, bent, curved, and/or flat, including any number of shape combinations designed to fit within cavity 40. As shown in FIGS. 2, 3, and 4, carrier 32 includes a plurality of ribs that are evenly spaced apart, and typically connected by one or more perpendicular walls. For example, as shown in FIG. 2, carrier 32 includes a plurality of ribs and substantially perpendicular connecting wall 33 that connects the ribs. Of course, carrier 32 may be configured to include any number of ribs and connecting walls 33. For example, carrier 32 may include a connecting wall 33 that is disposed on an external face of the ribs. Generally, each rib includes exposed vertical faces, and exposed horizontal faces positioned in close proximity to cavity walls 42. As shown in FIG. 3, the exposed faces of each rib generally provide a bonding surface for adhesive 36, as will be discussed in more detail below.

Carrier 32 can include various chemical or mechanical fasteners that hold system 30 in place within cavity 40. Carrier 32 can be initially placed or fixed in cavity 40 using any number of different methods or materials, including using a chemical bonding agent, a mechanical fastener, and/or an adhesive, including adhesive 36. For example, carrier 32 may be fixed in place using one or more clips, or some other mechanical fastener. Alternatively, carrier 32 may have leg supports (not shown) to retain carrier 32 in cavity 40 without using any mechanical or chemical fastener. Furthermore, cavity 40 may include various features, including brackets, legs, ledges, etc., to maintain system 30 in a particular location and/or orientation. Notably, carrier 32 holds expanding material 34 and adhesive 36 in place within cavity 40.

Carrier 32 typically holds expanding material 34 and adhesive 36 in a holding area 38. Expanding material 34 and adhesive 36 can be held in holding area 38 using any available method, including chemical or mechanical fasteners, such as glue, adhesives, or mechanical clips. Carrier 32 generally includes at least one holding area 38 to accommodate expanding material 34 and adhesive 32. As shown in FIGS. 2, 3, and 4, carrier 32 includes multiple vertically-oriented holding areas 38 that are periodically spaced throughout carrier 32.

As shown in FIG. 3, system 30 is configured such that expanding material 34 is substantially covered by adhesive 36. Put another way, expanding material 34 provides an inner core or interior layer, while adhesive 36 provides an outer layer. Typically, the two layers, expanding material 34 and adhesive 36, are configured to maintain a pre-expansion gap 44 between system 30 and walls 42 before activation. Providing pre-expansion gap 44 allows a manufacturer to apply liquid coatings to walls 42 within cavity 40, and also allows for greater assembly tolerances.

Generally, system 30 is configured such that when expanding material 34 is activated, adhesive 36 is pushed out of holding area 38, and into contact with cavity walls 42. During the activation process, both expanding material 34 and adhesive 36 change from a solid or formable dough phase to a liquid or substantially liquid phase. Expanding material 34 expands, thereby forcing adhesive 36 to flow out of holding area 38 and into contact with walls 42 and the exterior of carrier 32, substantially filling pre-expansion gap 44. After the activation process, adhesive 36 cures and transitions into a substantially solid phase, and has a strength sufficient to reinforce cavity 40. Since adhesive 36 bonds directly to cavity walls 42 and to carrier 32, expanding material 34 generally only serves to push the adhesive into position and does not necessarily serve as an internal structural reinforcement. Therefore, system 30 does not necessarily rely on expandable material 34 to provide internal structural reinforcement within cavity 40, but instead can rely on carrier 32 being bonded directly to cavity walls 42 by adhesive 36.

FIG. 3 illustrates system 30 within cavity 40 before activating expanding material 34 or adhesive 36. Before activation, expanding material 34 rests in an unexpanded state, occupying a space within carrier 32, such as within holding area 38. Generally, system 30 will be placed in cavity 40 within vehicle frame 10 during an early stage of the vehicle manufacturing process. At a later stage, vehicle frame 10 will undergo a heat treatment or baking process, such as during a painting process. Generally, expanding material 34 and adhesive 36 are materials that are heat activated, and as such, remain in an unactivated state until heat is applied. When expanding material 34 and adhesive 36 are activated by heat, adhesive 36 may have a lower melting or activation temperature so that it changes to a substantially liquid phase before expanding material 34 begins to expand. Alternatively, both expandable material 34 and adhesive 36 may have activation temperatures that are relatively close. Alternatively, expanding material 34 may have a lower activation temperature than adhesive 36, such that expanding material begins to expand before adhesive 36 changes to a substantially liquid phase. While activation generally occurs by applying heat, system 30 could also be activated through various other electrical or chemical processes, including using microwaves, ultrasonic waves, radiation, electric current, chemical reactions, etc. The proper activation method may depend on several factors, including the type of materials used for expanding material 34 and adhesive 36.

FIG. 4 illustrates system 30 within cavity 40 after undergoing an activation process. Following the activation process, expandable material 34 and adhesive 36 cure, transforming into a solid or a thermoset phase. As shown in FIG. 4, adhesive 36 bonds carrier 32 to walls 42, substantially filling pre-expansion gap 44. Expanding material 34, on the other hand, remains substantially within the confines of holding area 38 and does not contact walls 42 of cavity 40. Such a configuration provides a superior reinforcement system because many traditional adhesives can provide greater mechanical strength or stiffness than traditional structural foams. Unlike traditional reinforcement systems, system 30 does not rely on expanding material 34 to provide structural reinforcement within cavity 40. On the contrary, structural reinforcement is provided primarily by carrier 32, and secondarily by adhesive 36. As such, system 30 may be configured in any number of ways to ensure that expanding material 34 pushes adhesive 36 out and against walls 42 within cavity 40, and the disclosed embodiments are merely examples of several such configurations.

FIGS. 5 and 6 illustrate yet another configuration of a structural reinforcement system 30. As shown, carrier 32 includes a horizontally-oriented holding area 38 that includes periodic openings 39. As shown in FIGS. 5 and 6, carrier 32 can include an elongated rigid body that includes periodic openings 39. Expandable material 34 is placed in-between openings 39, and adhesive 36 is placed in-between blocks of expandable material 34. As shown in FIG. 6, expandable material 34 expands horizontally during activation, forcing adhesive 36 out through openings 39. Adhesive 36 then substantially fills pre-expansion gap 44 and bonds cavity walls 42 to carrier 32.

Expandable material 34 may be any material that expands during an activation process, including structural foams and non-structural foams. For example, expandable material 34 can be a non-structural expandable foam, such as SikaBaffle sold by Sika Corporation of Madison Heights, Mich. Sika-Baffle is described in U.S. Pat. Nos. 5,266,133 and 5,373,027 to Hanley et al., the disclosures of which are incorporated herein by reference. Alternatively, if greater reinforcing properties are desired with less expansion, expandable material 34 could be a reinforcing material or structural foam, such as that sold by Sika Corporation as SikaReinforcer. A series of these thermally expandable materials, owned by the Sika Corporation, are described in U.S. Pat. No. 6,387,470, which is hereby incorporated herein by reference in its entirety. Expandable material 34 could also be other thermally expandable materials, such as SikaFoam sold by Sika Corporation. Furthermore, expandable material 34 may be activated by an external heat source, or be internally activated by an exothermic reaction. Further, expandable material 34 may be activated by some other process, including using electric current, microwaves, ultrasonic waves, radiation, etc. Generally, the activation process used by expandable material 34 will be the same activation process used by adhesive 36, although the two could conceivably use different activation processes.

Adhesive 36 is generally a thermoset, one-component epoxy resin formulation that is a solid or a formable dough before activation. Suitable liquid epoxy resins include bisphenol-A epoxy resins such as the DER liquid epoxy resins that are commercially available through the Dow Chemical Co. in Midland Mich., and the EPON liquid epoxy resins that are commercially available through Resolution Performance Products in Houston, Tex. Adhesive 36 could also be SikaPower sold by the Sika Corporation. Adhesive 36 could be any other thermoset so long as the thermoset changes phases and bonds carrier 32 to walls 42. Further, adhesive 36 could be any other suitable bonding agent that can undergo an activation process as discussed above.

Expandable material 34 and adhesive 36 may also include various additives. Suitable additives include pigments, coloring agents, flame retardants, diluents, coupling agents, flexibilizers, chemical blowing agents, physical blowing agents, trace amount of cure accelerators, dispersants, wetting agents, defoaming agents, antioxidants, ultraviolet absorbers, photostabilizers such as HALS, and reinforcing agents such as rubber particles, and the like.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application.

I claim:

1. A structural reinforcement system, comprising:
   a rigid carrier defining a fixed outer perimeter, the rigid carrier including a holding area within the rigid carrier, the holding area defined at least in part by at least one of a rib and a connecting wall, the at least one of the rib and the connecting wall fixed to the carrier;
   an adhesive substantially disposed within the holding area; and
   an expandable material disposed adjacent to the rigid carrier and the adhesive so as to move the adhesive from a stored position to a bonding position when the expandable material expands, wherein the adhesive is positioned such that it is pushed at least partially out of the holding area and beyond the fixed outer perimeter of the carrier during expansion of the expandable material.

2. The structural reinforcement system of claim 1, wherein the at least one of the rib and the connecting wall includes a plurality of ribs that are connected by at least one connecting wall.

3. The structural reinforcement system of claim 1, wherein the holding area is defined by a plurality of ribs.

4. The structural reinforcement system of claim 1, wherein the holding area is defined at least in part by an indentation in an exterior face of the carrier.

5. The structural reinforcement system of claim 1, wherein the rigid carrier includes an elongated substantially hollow body having a plurality of openings thereby defining the holding area.

6. The structural reinforcement system of claim 1, wherein the carrier is a metal, a composite, a plastic, or any combination thereof.

7. The structural reinforcement system of claim 1, wherein the expandable material is a structural foam, or a non-structural foam.

8. The structural reinforcement system of claim 1, wherein the adhesive is a thermoset epoxy resin.

9. The structural reinforcement system of claim 1, wherein the adhesive is pushed by the expandable material along an exterior face of the rigid carrier when the expandable material expands.

10. The structural reinforcement system of claim 1, wherein the expandable material and the adhesive are activated by at least one activation process selected from a group comprising:
    heat, electric current, microwaves, ultrasonic waves, and radiation.

11. The structural reinforcement system of claim 1, wherein the expandable material expands during an activation process, thereby pushing the adhesive away from the holding area.

12. The structural reinforcement system of claim 1, wherein the holding area restricts the expandable material within the holding area during expansion of the expandable material.

13. The structural reinforcement system of claim 1, wherein the holding area defines a cross-section within the holding area substantially filled by the expandable material prior to expansion of the expandable material, thereby restricting expansion of the expandable material to a first direction generally normal to the cross-section, and the adhesive material is pushed by the expandable material in a second direction during expansion of the expandable material, the second direction substantially perpendicular to the first direction.

14. The structural reinforcement system of claim 1, wherein at least a portion of the expandable material is in contact with the rigid carrier and the adhesive, the portion of the expandable material disposed between the rigid carrier and the adhesive.

15. The structural reinforcement system of claim 1, wherein the at least one of the rib and the connecting wall restricts expansion of at least a portion of the expandable material to a first direction along the at least one of the rib and the connecting wall, and at least a portion of the adhesive material flows in a second direction during expansion of the expandable material, the second direction substantially perpendicular to the first direction.

16. The structural reinforcement system of claim 1, wherein the at least one of the rib and the connecting wall includes a plurality of ribs that are interconnected.

17. A structural reinforcement system, comprising:
    a rigid carrier defining a fixed outer perimeter and having a holding area within the fixed outer perimeter of the rigid carrier, the holding area defined at least in part by at least one of a rib and a connecting wall, the at least one of the rib and the connecting wall fixed to the carrier, wherein the carrier is configured to fit within a cavity of a vehicle frame;
    an expandable material disposed within the holding area of the carrier;
    an adhesive disposed within the holding area of the carrier, wherein the expandable material and the adhesive are disposed such that the expandable material causes the adhesive to move away from the holding area, beyond the fixed outer perimeter of the carrier, and into contact with an exterior surface of the carrier and an interior wall of the cavity when the expandable material expands.

18. The structural reinforcement system of claim 17, wherein the at least one of the rib and the connecting wall includes a plurality of ribs that are connected by at least one connecting wall.

19. The structural reinforcement system of claim 17, wherein the holding area is defined by an indentation in an exterior face of the carrier.

20. The structural reinforcement system of claim 17, wherein the rigid carrier includes an elongated substantially hollow body having a plurality of openings.

21. The structural reinforcement system of claim 17, wherein at least a portion of the expandable material is disposed between the rigid carrier and the adhesive such that the expandable material forces the adhesive into contact with the interior wall of the cavity when the expandable material expands.

* * * * *